United States Patent
Lin (10) Patent No.: US 10,534,155 B2
(45) Date of Patent: Jan. 14, 2020

(54) OPTICAL ELEMENT DRIVING MECHANISM

(71) Applicant: TDK TAIWAN CORP., Yangmei Taoyuan (TW)

(72) Inventor: Wen-Chang Lin, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 135 days.

(21) Appl. No.: 15/812,572

(22) Filed: Nov. 14, 2017

(65) Prior Publication Data

US 2018/0136430 A1 May 17, 2018

Related U.S. Application Data

(60) Provisional application No. 62/421,616, filed on Nov. 14, 2016.

(30) Foreign Application Priority Data

Nov. 7, 2017 (CN) .......................... 2017 1 1085004

(51) Int. Cl.
*G02B 7/04* (2006.01)
*G02B 7/02* (2006.01)
*G02B 1/04* (2006.01)

(52) U.S. Cl.
CPC ............... *G02B 7/023* (2013.01); *G02B 1/04* (2013.01); *G02B 7/022* (2013.01); *G02B 7/026* (2013.01)

(58) Field of Classification Search
CPC . G02B 7/023; G02B 7/08; G02B 1/04; G02B 27/646; G02B 7/026; G02B 7/022
See application file for complete search history.

(56) References Cited

U.S. PATENT DOCUMENTS

2008/0084620 A1* 4/2008 Lee ........................ G02B 7/021
359/824

* cited by examiner

*Primary Examiner* — Joseph P Martinez
(74) *Attorney, Agent, or Firm* — Muncy, Geissler, Olds & Lowe, P.C.

(57) ABSTRACT

An optical element driving mechanism is provided, including a first component, a second component, an optical element driving assembly, and a flexible plastic structure. The second component is disposed corresponding to the first component. The first component has a first surface facing the second component. The optical element driving assembly is configured to force the optical element to move. The flexible plastic structure is formed on the first surface of the first component, and the hardness of the first component is greater than that of the flexible plastic structure.

18 Claims, 13 Drawing Sheets

OPTICAL ELEMENT DRIVING MECHANISM

CROSS REFERENCE TO RELATED APPLICATIONS

This application claims the benefit of U.S. Provisional Application No. 62/421,616, filed Nov. 14, 2016, and claims priority of China Patent Application No. 201711085004.4, filed Nov. 7, 2017, the entirety of which are incorporated by reference herein.

BACKGROUND

Technical Field

The disclosure relates to an optical element driving mechanism, and in particular to an optical element driving mechanism with flexible plastic structures.

Description of the Related Art

Plastic materials used in optical element driving mechanisms nowadays have many problems, for example, the surface of the plastic material is too smooth, making bonding difficult. In addition, the plastic materials still have to have a certain degree of hardness in order to maintain the basic strength of the components. When the above plastic materials collide with other components, particles are usually generated, affecting the performance of the driving mechanism.

BRIEF SUMMARY

Some embodiments of the disclosure provide an optical element driving mechanism, including: a first component, a second component, an optical element driving assembly, and a flexible plastic structure. The second component is disposed corresponding to the first component. The first component has a first surface, and the first surface is facing the second component. The optical element driving assembly is configured to drive the optical element. The flexible plastic structure is formed on the first surface of the first component, and the hardness of the first component is greater than that of the flexible plastic structure.

In an embodiment, the second component is movable relative to the first component.

In an embodiment, the second component further includes a second surface facing the first component, and the flexible plastic structure is further formed on the second surface of the second component.

In an embodiment, the optical element driving mechanism further includes a rolling element, and the rolling element is disposed between the first component and the second component.

In an embodiment, the flexible plastic structure has a protruding portion, and the protruding portion is in contact with the second component.

In an embodiment, the optical element driving mechanism further includes a contact block formed on the protruding portion and in contact with the second component, and the hardness of the contact block is greater than that of the flexible plastic structure.

In an embodiment, the first component further has a protruding stopping portion, wherein the flexible plastic structure is formed on the second component, and when the second component moves to a limit position relative to the first component, the flexible plastic structure is in contact with the stopping portion.

In an embodiment, the optical element driving mechanism further includes a housing, and the housing is connected to the first component, wherein the flexible plastic structure is formed between the housing and the first component.

In an embodiment, the housing and the first component are press-fitted.

In an embodiment, the flexible plastic structure is formed by double injection, insert molding, or chemical plating.

In an embodiment, the Share D Hardness of the flexible plastic structure is in a range of 32 degrees to 82 degrees.

In an embodiment, the flexible plastic structure is a thermoplastic polyester elastomer or a Hytrel®8238 elastomer.

Some embodiments of the disclosure provide an optical element driving mechanism, including: a first component, a second component, an optical element driving assembly, an elastic element, and a flexible plastic structure. The second component is disposed corresponding to the first component, and the second component is movable relative to the first component. The optical element driving assembly is configured to drive the optical element. The elastic element connects the first component with the second component. The flexible plastic structure is formed on the elastic element, and the hardness of the first component is greater than that of the flexible plastic structure.

In an embodiment, the elastic element further includes a first section and a second section, and the flexible plastic structure connects the first section with the second section.

In an embodiment, the flexible plastic structure completely encompasses the elastic element.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical element driving mechanisms of some embodiments of the present disclosure are described in the following description. However, it should be appreciated that the following detailed description of some embodiments of the disclosure provides various concepts of the invention which may be performed in widely various specific background. The specific embodiments disclosed are provided merely to clearly describe the invention in some specific methods without limiting the scope of the invention.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Figure 1:
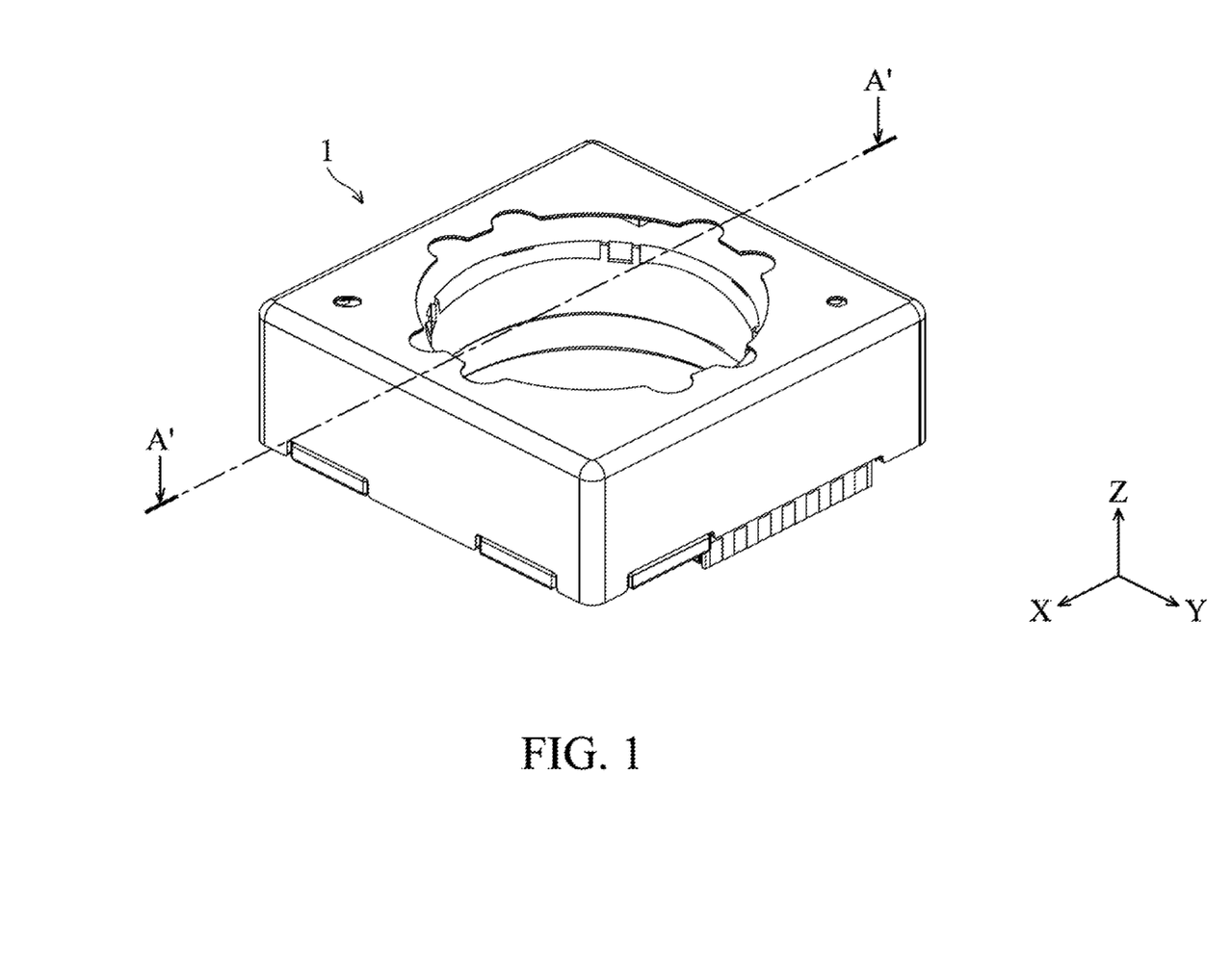
FIG. 1 is a schematic perspective view illustrating an optical element driving mechanism in accordance with an embodiment of the present disclosure.
Figure 2:
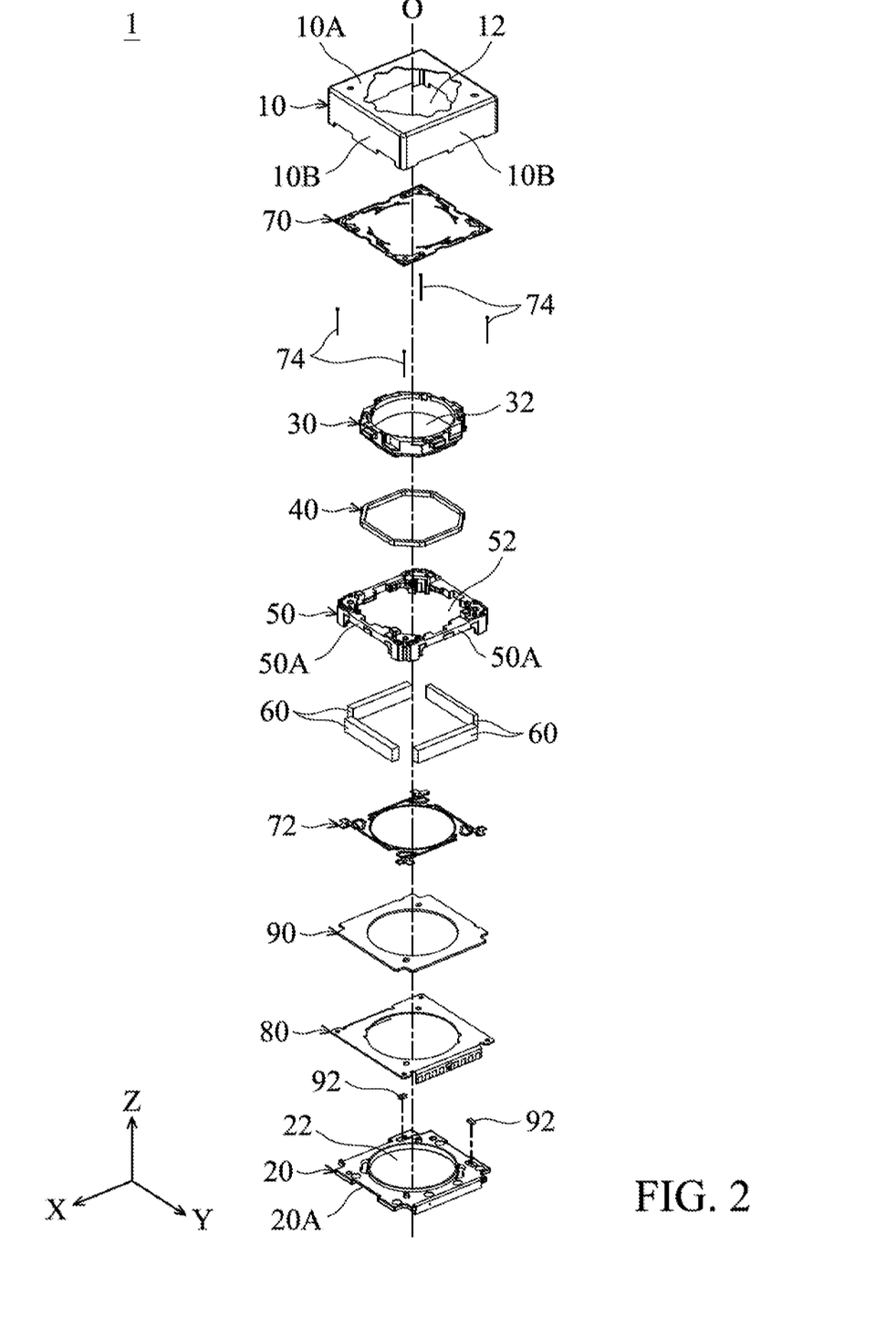
FIG. 2 is an exploded diagram illustrating the optical element driving mechanism in FIG. 1.
Figure 3:
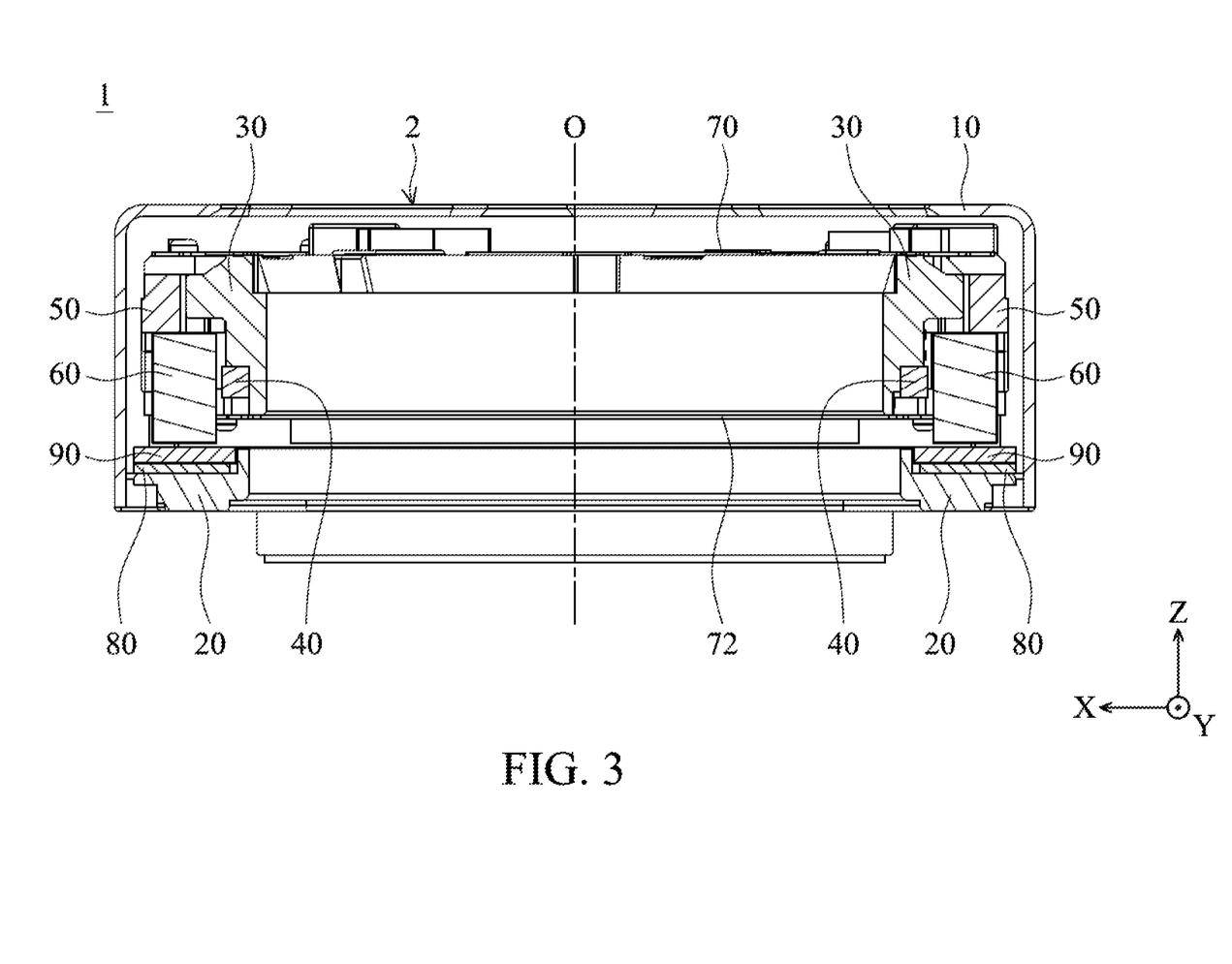
FIG. 3 is a cross-sectional view illustrating the optical element driving mechanism along the line A-A' in FIG. 1.

Referring to FIGS. 1-3, wherein FIG. 1 is a schematic perspective view illustrating an optical element driving mechanism 1 in accordance with an embodiment of the present disclosure, FIG. 2 is an exploded diagram illustrating the optical element driving mechanism 1 in FIG. 1, and FIG. 3 is a cross-sectional view illustrating the optical element driving mechanism along the line A-A' in FIG. 1. It should be noted that in the embodiment, the optical element driving mechanism 1 is, for example, a voice coil motor (VCM), which may be disposed in the electronic devices with camera function, and can perform auto-focusing (AF) and optical image stabilization (OIS) functions.

As shown in FIGS. 1-3, the optical element driving mechanism 1 mainly includes a housing 10, a base 20, a holder 30, a driving coil 40, a frame 50, a plurality of magnetic elements 60, an upper plated spring 70, a lower plated spring 72, a plurality of suspension wires 74, a circuit board 80, a driving plate 90 and at least one sensing element 92.

The housing 10 has a hollow structure, a top wall 10A, and four sidewalls 10B, and can be connected to the base 20. The base 20 has a bottom wall 20A corresponding to the top wall 10A of the housing 10. It should be appreciated that openings 12 and 22 are formed on the housing 10 and the base 20, respectively. The center of the opening 12 corresponds to an optical axis O of an optical element (not shown). The opening 22 corresponds to an image-sensing element (not shown) disposed outside the optical element driving mechanism 1, and thereby the optical element (such as a lens) disposed in the optical element driving mechanism 1 can perform a focusing function with the image-sensing element in the direction of the optical axis O.

The holder 30 has a hollow structure, and a through hole 32 is formed therein, wherein the optical element is secured in the through hole 32.

The frame 50 has an opening 52 and four recesses 50A, wherein the recesses 50A respectively correspond to the four sidewalls 10B of the housing 10. Four magnetic elements 60 can be fixed in the four recesses 50A. In some embodiments, the four magnetic elements 60 can also be fixed in the four corners of the frame 50, and the magnetic elements 60 have a longitudinal structure.

FIG. 3 is a cross-sectional view illustrating the optical element driving mechanism 1 along the line A-A' in FIG. 1. As shown in FIGS. 2 and 3, the holder 30 and the frame 50 are movably connected to the housing 10 and the base 20. To be more specific, the holder 30 and the frame 50 are connected by the upper plated spring 70 and the lower plated spring 72, which are made of metal materials, and thereby the holder 30 is suspended in the center of the frame 50.

In addition, one end of each of the four suspension wires 74 is connected to the base 20, and the other end is connected to the upper plated spring 70, and thereby the frame 50 and the holder 30 disposed therein can move along the horizontal direction (XY-plane) relative to the housing 10, wherein the material of the suspension wires 74 can include, for example, metal.

In this embodiment, the circuit board 80 is electrically connected to a driving unit (not shown) disposed outside the optical element driving mechanism 1, and is configured to perform auto-focusing (AF) and optical image stabilization (OIS) functions. The magnetic elements 60 and the driving coil 40, which are disposed outside the holder 30, can constitute an optical element driving assembly. When a current is applied to the circuit board 80 by an electromagnetic driving force generated by the driving coil 40 and the magnetic elements 60, the holder 30 and the optical element can be forced to move along the Z-axis direction (the direction of the optical axis O) relative the frame 50 to perform an auto-focusing (AF) function.

The driving board 90 is, for example, a printed circuit board (PCB). At least one coil (not shown) corresponding to the magnetic elements 60 is disposed inside the driving board 90, and configured to generate an electromagnetic driving force between the magnetic elements 60 to force the holder 30 and the optical element to move along the direction perpendicular to the direction of the optical axis O (parallel to the XY-plane) relative to the driving board 90 to compensate for the displacement in the X-axis and Y-axis directions such that the optical image stabilization (OIS) function is achieved.

It should be noted that the electrical signals may be sent to the driving coil 40 outside the holder 30 and the coils (not shown) disposed in the driving plate 90 through the circuit board 80, and the circuit board 80 may also send the electrical signals to the driving coil 40 through the suspension wires 74 and the upper plated spring 70, and thereby the movement of the holder 30 and the frame 50 in the X-axis, Y-axis and Z-axis directions is controlled.

Sensing elements 92, for example a Hall effect sensor, a magnetoresistive (MR) sensor, or a fluxgate, are electrically connected to the circuit board 80 and are installed on different respective sides of the base 20, and thereby the sensing elements 92 can be used to detect the magnetic elements 60 on the frame 50 to obtain the displacement of the frame 50 and the holder 30 in the X-axis and Y-axis directions relative to the base 20.

In this embodiment, the holder 30, the driving coil 40, the frame 50, the magnetic elements 60, the upper plated spring 70, the lower plated spring 72 and the suspension wires 74 may constitute a movable portion MP (see FIG. 2). In addition, the housing 10, the base 20, the circuit board 80 and the driving board 90 may constitute a fixed portion FP (see FIG. 2), wherein the movable portion MP can move relative to the fixed portion FP along the horizontal or perpendicular direction.

Figure 4A:
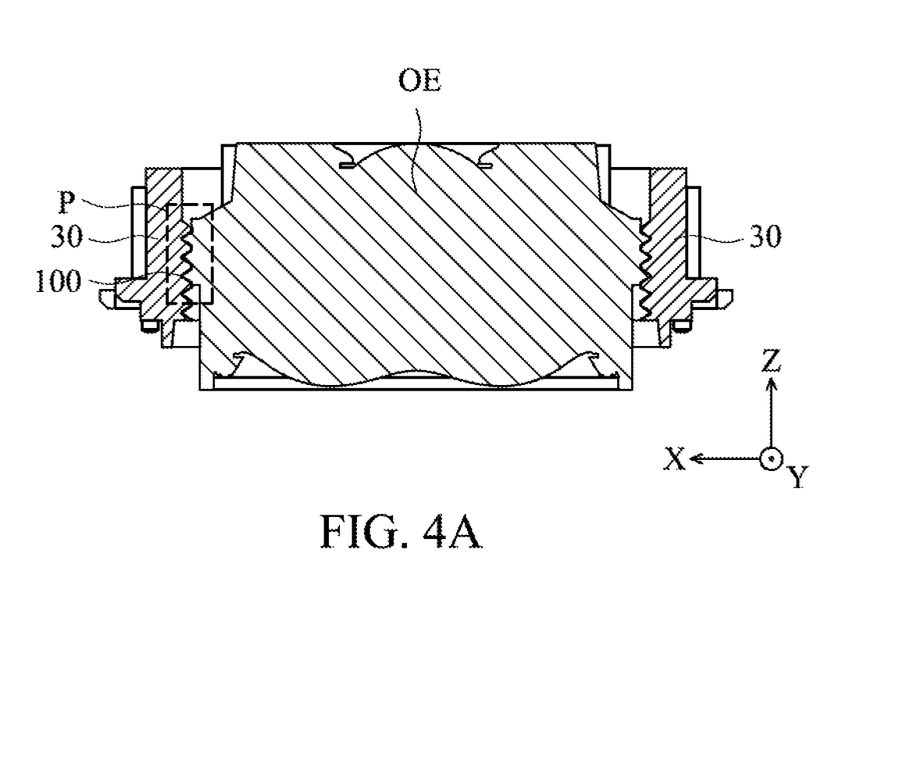
FIG. 4A is a schematic view illustrating a holder and an optical element after assembly in accordance with the embodiment shown in FIG. 3.
Figure 4B:
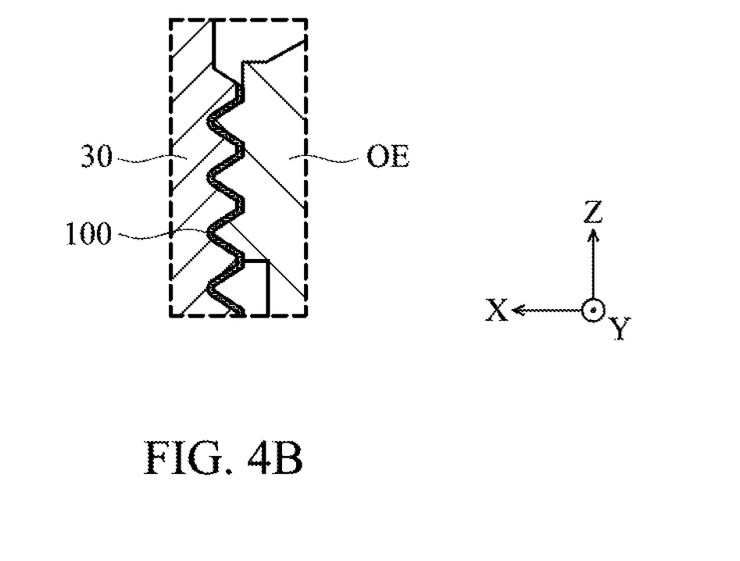
FIG. 4B is a schematic enlarged view illustrating the region P in FIG. 4A.

Referring to FIGS. 4A-4B, FIG. 4A is a schematic view illustrating the holder 30 and an optical element OE after assembly in accordance with the embodiment shown in FIG. 3, wherein a threaded structure is formed on the inner surface of the holder 30, and FIG. 4B is a schematic enlarged view illustrating the region P in FIG. 4A. As shown in FIGS. 4A-4B, the holder 30 and the optical element OE are assembled by the threaded structures, that is, corresponding threaded surfaces are formed on the holder 30 and the optical element OE. The holder 30 and the optical element OE are connected by the assembly of corresponding threaded surfaces. As shown in FIG. 4B, a flexible plastic structure 100 (which may be selected from non-stick flexible plastic materials) is formed on at least one of the opposite surfaces of the holder 30 and the optical element OE. A buffer region can be provided between the holder 30 and the optical element OE by disposing the flexible plastic structure 100, such that the mechanical interference generated due to tolerance of the size difference between the holder 30 and the optical element OE can be prevented. Accordingly, problems such as a failure to assemble the holder 30 and the optical element OE, or an oversized gap being generated between the holder 30 and the optical element OE, can also be avoided.

The material of the flexible plastic structure 100 is, for example, Hytrel®8238 elastomer manufactured by DuPont, wherein the flexible plastic structure 100 can be formed on the holder 30 and the optical element OE using, for example, double injection. The Shore D Hardness of Hytrel®8238 elastomer is in a range of about 70 degrees to about 76 degrees. In some embodiments, the flexible plastic structure 100 may comprise thermoplastic polyester elastomer (TPEE) having a Shore D Hardness in a range of about 32 degrees to about 82 degrees.

It should be noted that some components in the optical element driving mechanism 1 usually use harder plastic materials, wherein particles may be generated after different components rubbing such that the image quality is affected. Therefore, forming the flexible plastic structure 100 on the surface of some components can solve the above problem.

Figure 5A:
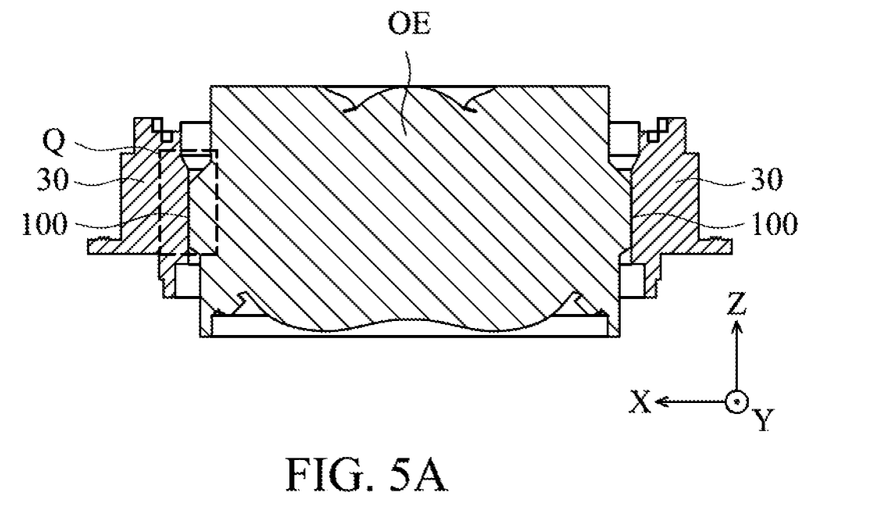
FIG. 5A is a schematic view illustrating the holder and the optical element after assembly in accordance with another embodiment of the present disclosure.
Figure 5B:
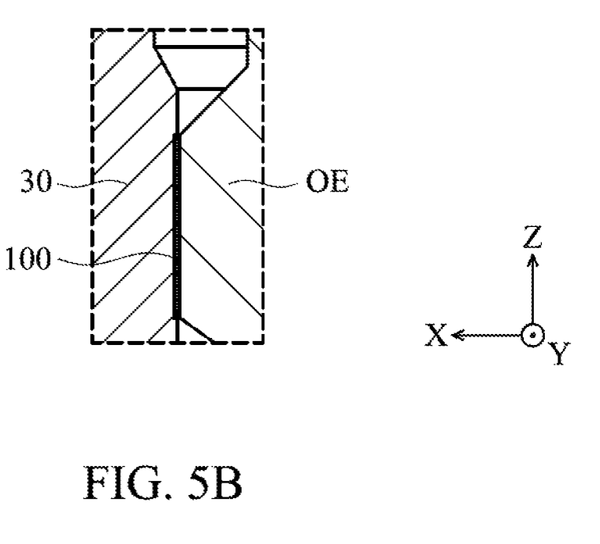
FIG. 5B is a schematic enlarged view illustrating the region Q in FIG. 5A.

Referring to FIGS. 5A-5B, FIG. 5A is a schematic view illustrating the holder 30 and the optical element OE after assembly in accordance with another embodiment of the present disclosure, and FIG. 5B is a schematic enlarged view illustrating the region Q in FIG. 5A. The difference between this embodiment and the embodiment shown in FIGS. 4A-4B is that the holder 30 and the optical element OE are connected on cylindrical surface, wherein the flexible plastic structure 100 (such as Hytrel®8238 elastomer) is formed on at least one of the opposite surfaces of the holder 30 and the optical element OE by double injection in this embodiment. Therefore, it can be avoided that particles generated due to different components rubbing such that the image quality is affected, and the mechanical interference generated due to tolerance of size between the holder 30 and the optical element OE can be prevented. Furthermore, an adhesive may be further applied around the surface of the flexible plastic structure 100 to strengthen the connection between the holder 30 and the optical element OE. Alternatively, only the flexible plastic structure 100 may be formed on the surface of the holder 30 or the optical element OE, and the adhesive is not applied, wherein the holder 30 and the optical element OE can be assembled more easily because the flexible plastic structure 100 has slight flexibility.

Figure 6:
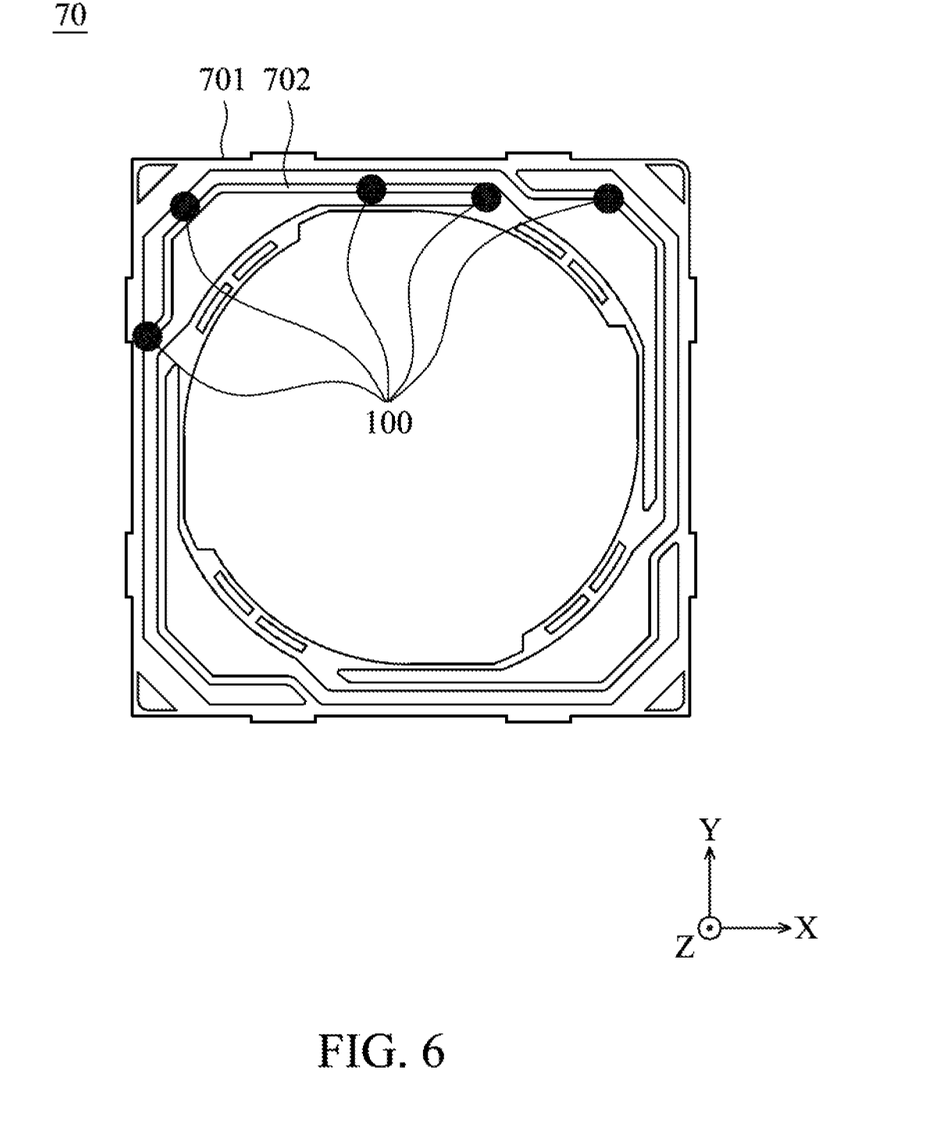
FIG. 6 is a top view illustrating relative positions between an upper plated spring and the flexible plastic structure after assembly.

Alternatively, as shown in FIG. 6, the flexible plastic structure 100 (which may be selected from non-stick flexible plastic materials, such as Hytrel®8238 elastomer) may be formed on the upper plated spring 70 or the lower plated spring 72 (elastic element) by insert molding or chemical plating. The flexible plastic structure 100 is configured to be a damping material to absorb elastic vibration such that the movable portion MP becomes stable faster when moving. The conventional damping material used in the optical element driving mechanism is usually gel. However, gel usually suffers from the problem of stability due to its physical property. In this embodiment, the above problem of gel can be solved by applying the flexible plastic structure 100. For example, the upper plated spring 70 has a frame border 701 (the first section) that is fixed on the frame 50 and a chord wire 702 (the second section) that can be deformed. The flexible plastic structure 100 may be formed on the frame border 701 (the first section) or the chord wire 702 (the second section) as required. Alternatively, the flexible plastic structure 100 may be formed between the frame border 701 (the first section) and the chord wire 702 (the second section), and connect each other.

In addition, in another embodiment, the flexible plastic structure 100 may be formed on a surface of the elastic element such as the upper plated spring 70 or the lower plated spring 72 (for example, the surface of the chord wire 702) that may be in contact with other metal components in the optical element driving mechanism 1. Therefore, the above elastic element is insulated from other metal components in the optical element driving mechanism 1, and the elastic element is protected from damage and from particles caused by excessive contact between the components. Furthermore, the elastic element may also be completely encompassed by the flexible plastic structure 100, and thereby the vibration generated in the moving process can be absorbed more effectively to achieve effective protection of the elastic element.

Figure 7A:
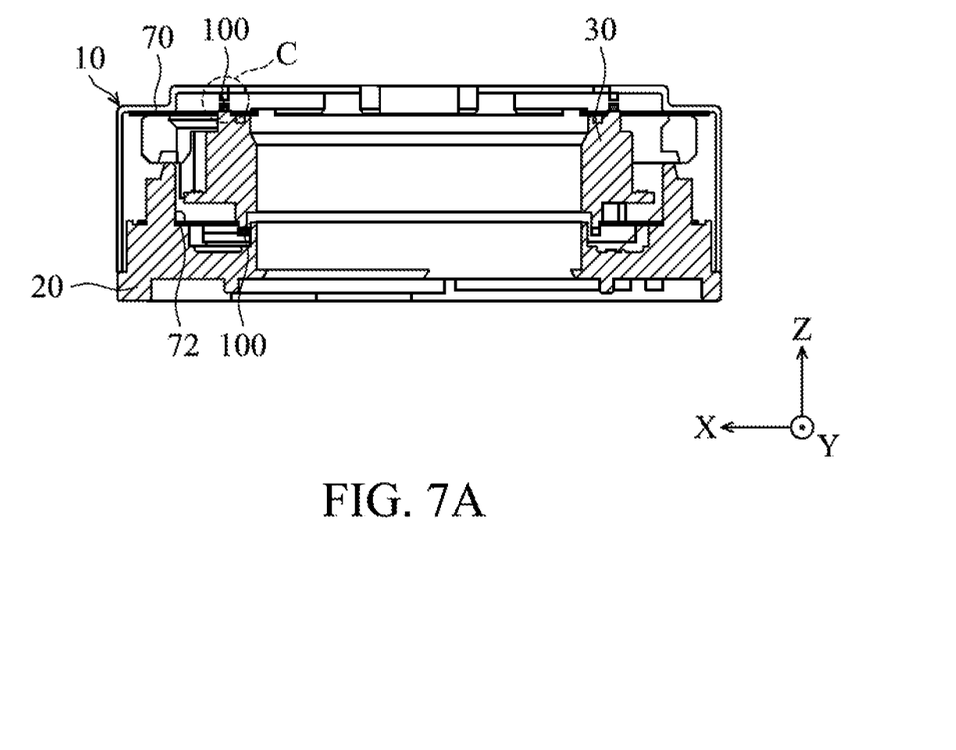
FIG. 7A is a cross-sectional view illustrating a housing, a base, the holder, the upper plated spring, a lower plated spring, and the flexible plastic structure of the optical element driving mechanism after assembly in accordance with another embodiment of the present disclosure.
Figure 7B:
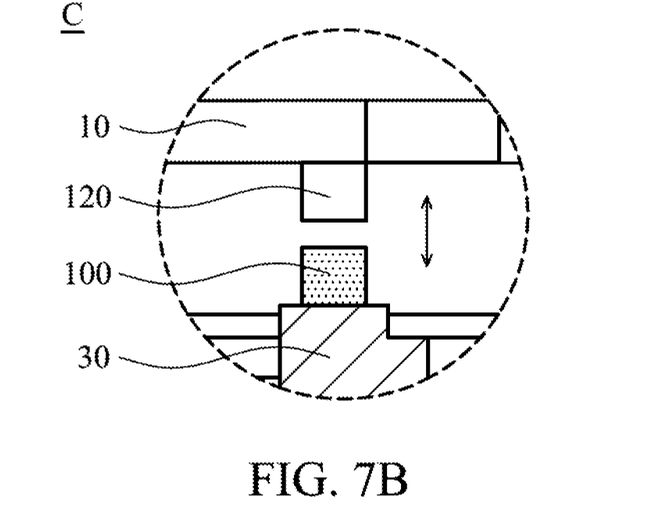
FIG. 7B is a schematic enlarged view illustrating the region C in FIG. 7A.

Referring to FIGS. 7A-7B, FIG. 7A is a cross-sectional view illustrating the housing 10, the base 20, the holder 30, the upper plated spring 70, the lower plated spring 72 and the flexible plastic structure 100 of the optical element driving mechanism after assembly in accordance with another embodiment of the present disclosure, and FIG. 7B is a schematic enlarged view illustrating the region C in FIG. 7A. As shown in FIGS. 7A-7B, no frame 50 is disposed in the optical element driving mechanism of this embodiment, wherein the upper plated spring 70 is movably connected to the holder 30 and the housing 10, and the housing 10 has a stopping portion 120 (see FIG. 7B) protruding towards inner direction. The stopping portion 120 is configured to limit the moving range of the holder 30 (the second component) along the perpendicular direction (the Z-axis direction) relative to the base 20 (the first component). For example, as shown in FIG. 7B, when the holder 30 (the second component) moves upwards relative to the base 20 (the first component), the stopping portion 120 will contact the flexible plastic structure 100 formed on the holder 30 (the second component) to restrict the holder 30 (the second component) at a limit position such that the holder 30 is protected from damage due to severely colliding with the housing 10 when moving. It should be understood that the flexible plastic structure 100 (such as Hytrel®8238 elastomer) is formed on the top surface of the holder 30 (the second component) using double injection. Therefore, when the holder 30 (the second component) moves to the limit position, the flexible plastic structure 100 contacts the stopping portion 120 as a buffer such that the particles generated due to friction between the stopping portion 120 and the holder 30 can be reduced to avoid adverse influence to the operation of the optical element driving mechanism and the image quality. Similarly, the flexible plastic structure 100 (see FIG. 7A) may also be formed on the bottom surface of the holder 30 (the second component), and thereby the flexible plastic structure 100 may be in contact with the corresponding stopping portion of the base 20 (the first component) to absorb the impact.

Figure 8:
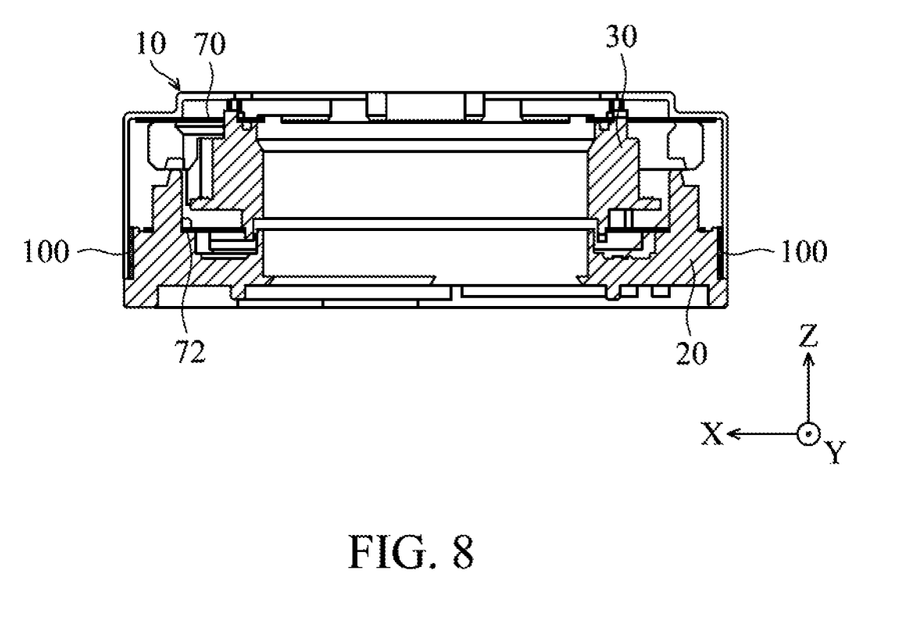
FIG. 8 is a cross-sectional view illustrating the housing, the base, the holder, the upper plated spring, the lower plated spring and the flexible plastic structure of the optical element driving mechanism after assembly in accordance with another embodiment of the present disclosure.

Referring to FIG. 8, FIG. 8 is a cross-sectional view illustrating the housing 10, the base 20, the holder 30, the upper plated spring 70, the lower plated spring 72, and the flexible plastic structure 100 of the optical element driving mechanism after assembly in accordance with another embodiment of the present disclosure. As shown in FIG. 8, the flexible plastic structure 100 (such as Hytrel®8238 elastomer) may also be disposed in the gap between the housing 10 and the base 20 (the first component) using double injection, insert molding or chemical plating. Therefore, the housing 10 and the base 20 may be press-fitted with each other, enhancing the connection strength between the housing 10 and the base 20. In addition, a flexible plastic material with rough surface may also be formed on the housing 10 and the base 20. In this way, an adhesive may be applied on the surface of the flexible plastic structure 100, enhancing the connection effect between the housing 10 and the base 20 (the first component). Similarly, the flexible plastic structure 100 may also be formed between the holder 30 and the optical element driving assembly (such as the magnetic elements or the driving coil), between the frame 50 and the optical element driving assembly, or between the elastic element (such as the upper plated spring 70 or the lower plated spring 72) and the other components using double injection, insert molding or chemical plating to enhance the connection strength between the above components.

Figure 9A:
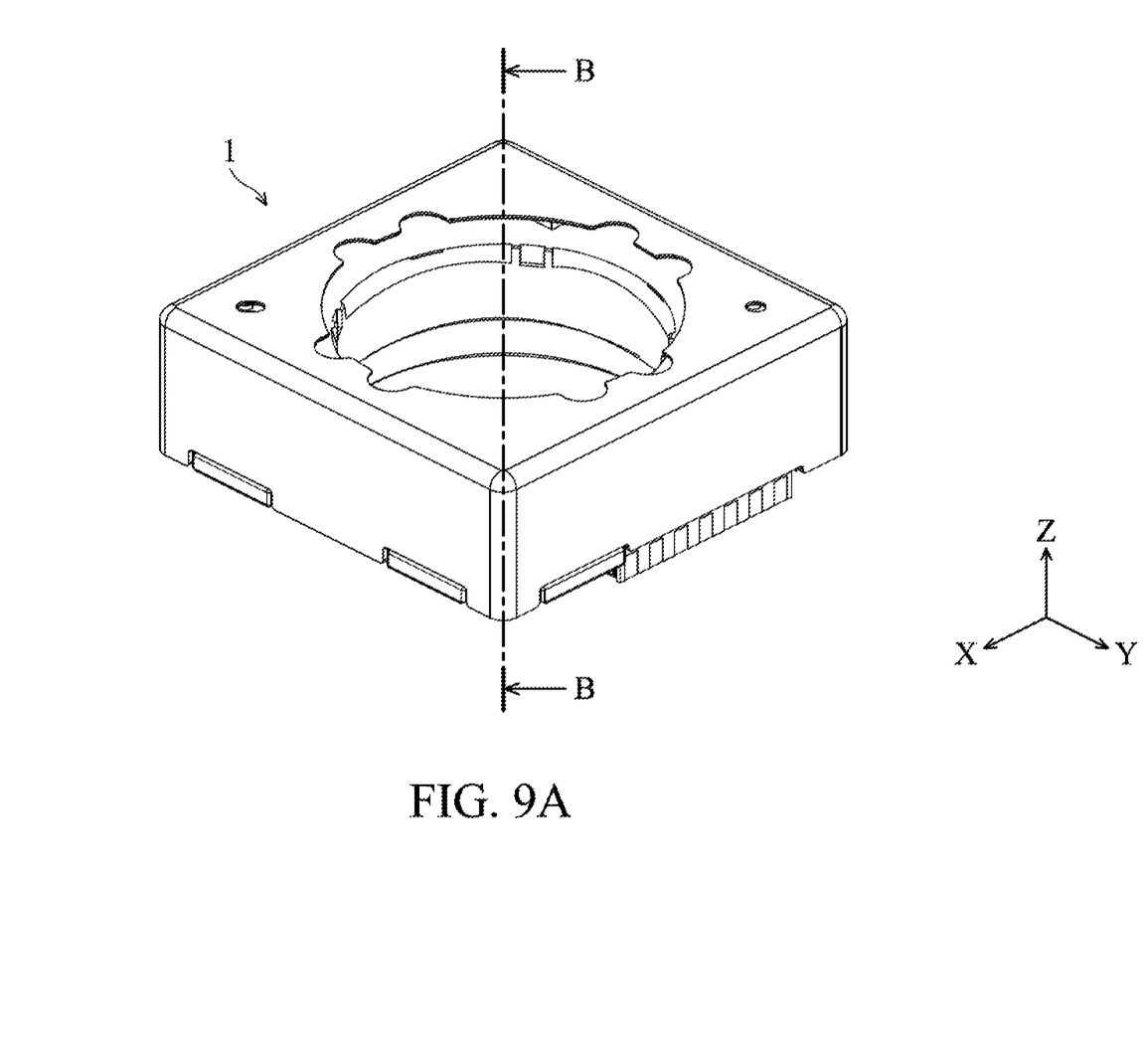
FIG. 9A is a schematic perspective view illustrating the optical element driving mechanism in accordance with another embodiment of the present disclosure.
Figure 9B:
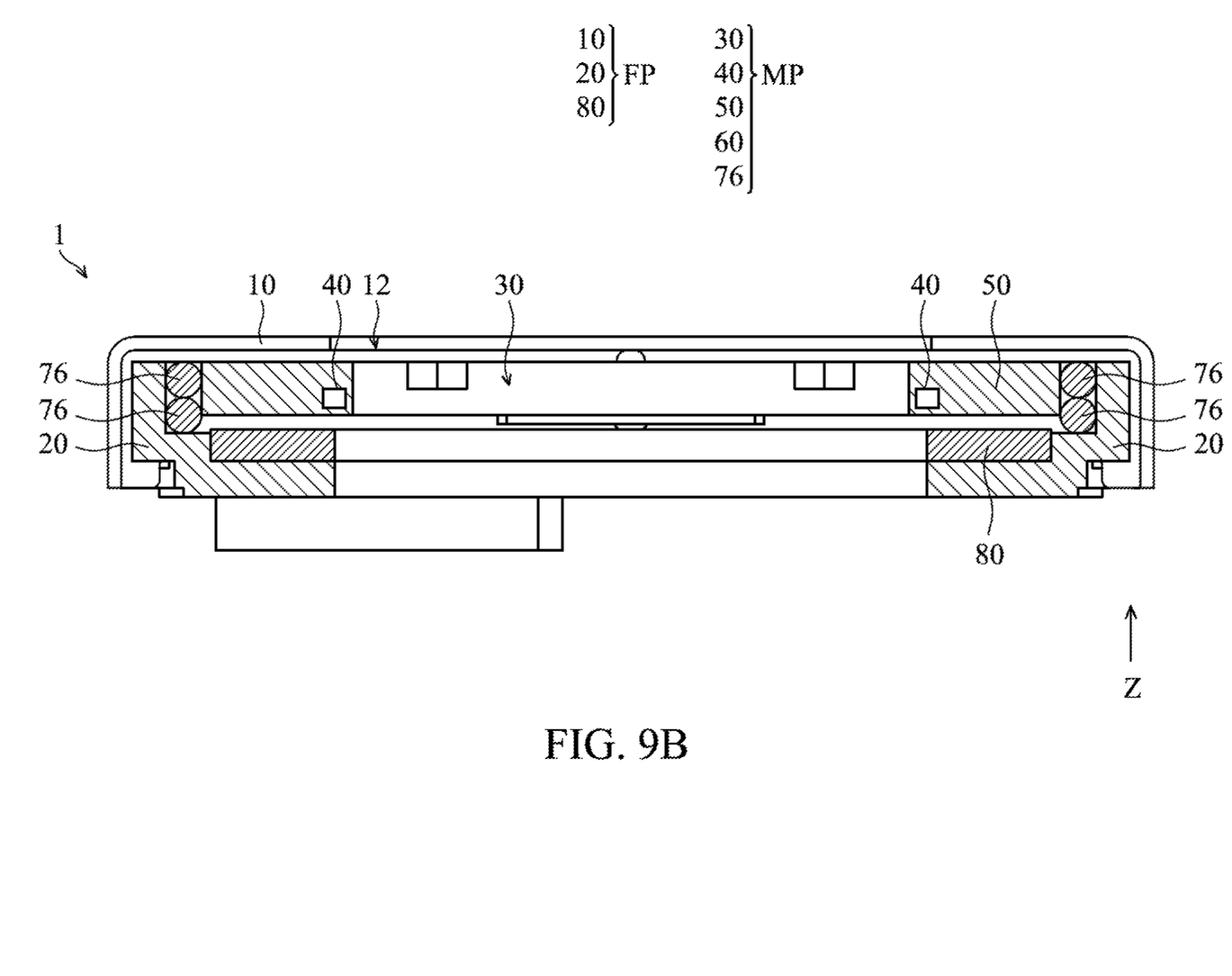
FIG. 9B is a cross-sectional view illustrating the optical element driving mechanism along the line B-B' in FIG. 9A.

Referring to FIGS. 9A-9B, FIG. 9A is a schematic perspective view illustrating the optical element driving mechanism 1 in accordance with another embodiment of the present disclosure, and FIG. 9B is a cross-sectional view illustrating the optical element driving mechanism along the line B-B' in FIG. 9A. The main difference between this embodiment and the embodiment shown in FIGS. 1-3 is that the frame 50 and the driving board 90 are omitted from this embodiment, and the upper plated spring 70, the lower plated spring 72 and the plurality of suspension wires 74 are replaced by at least one rolling element 76. As shown in FIG. 9B, the holder 30, the driving coil 40, the magnetic elements 60 and the rolling elements 76 may constitute a movable portion MP. In addition, the housing 10, the base 20 and the circuit board 80 may constitute a fixed portion FP. Disposing the rolling elements 76 between the base 20 (the first component) and the holder 30 (the second component) allows the movable portion MP to be movably connected to the fixed portion FP, and the movable portion MP can move upwards or downwards relative to the fixed portion FP along the perpendicular direction (the Z-axis direction).

As shown in FIG. 9B, two rolling elements 76 are disposed on the opposite sides of the movable portion MP, and in contact with the movable portion MP and the fixed portion FP. The driving coil 40 and the magnetic elements 60 generate an electromagnetic driving force such that the movable portion MP and the optical element can be forced to move relative to the fixed portion FP along the Z-axis direction (the direction of the optical axis O) through the rolling elements 76, and the function of auto-focusing (AF) is performed.

Figure 10A:
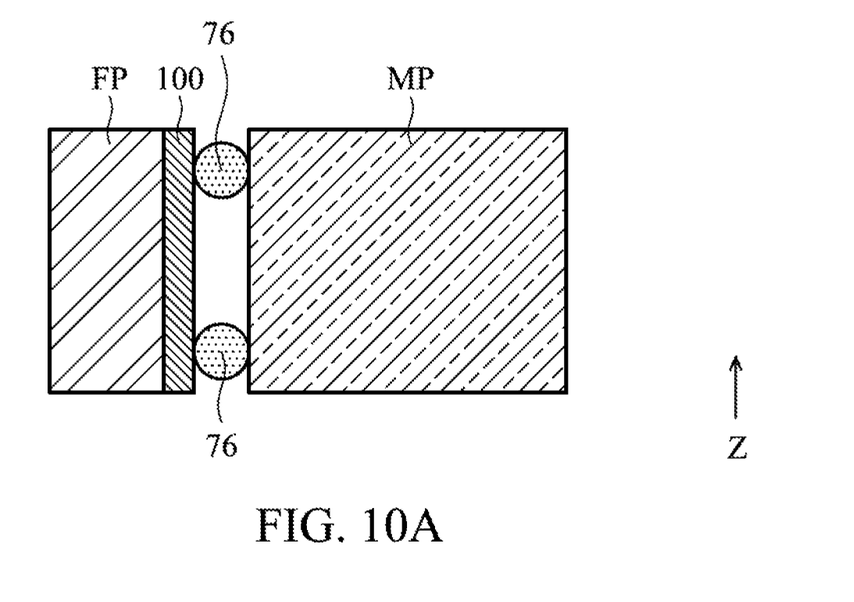
FIGS. 10A-10C are schematic views illustrating relative positions between the base, the holder, the rolling elements and the flexible plastic structure after assembly in accordance with an embodiment of the present disclosure.

Referring to FIGS. 10A-10E, FIG. 10A is a schematic view illustrating relative positions between the base 20, the holder 30, the rolling elements 76 and the flexible plastic structure 100 after assembly in accordance with an embodiment of the present disclosure. As shown in FIG. 10A, the base 20 (the first component) has a surface (the first surface) facing the holder 30 (the second component), and the holder 30 (the second component) has a surface (the second surface) facing the base 20 (the first component). The rolling elements 76 are disposed between the base 20 (the first component) and the holder 30 (the second component), and in contact with the flexible plastic structure 100 (such as Hytrel®8238 elastomer), which is formed on the surface of the base 20 (the first component) by double injection. Accordingly, the flexible plastic structure 100 may compensate for the tolerance of the size difference between rolling elements 76 such that the base 20 and the holder 30 can be stably connected through the rolling elements 76, wherein the hardness of the flexible plastic structure 100 is less than that of the base 20 (the first component).

Figure 10B:
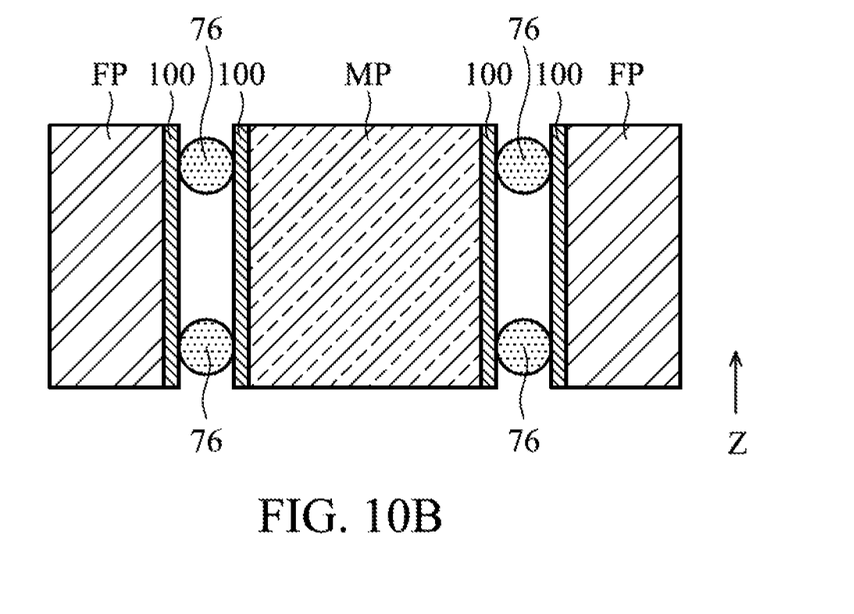

FIG. 10B is a schematic view illustrating relative positions between the base 20, the holder 30, the rolling elements 76 and the flexible plastic structure 100 after assembly in accordance with another embodiment of the present disclosure. The difference between this embodiment and the embodiment shown in FIG. 10A is that the flexible plastic structure 100 is formed on the surfaces of the base 20 (the first component) and the holder 30 (the second component), and thereby the rolling elements 76 are held between the base 20 and the holder 30.

Figure 10C:
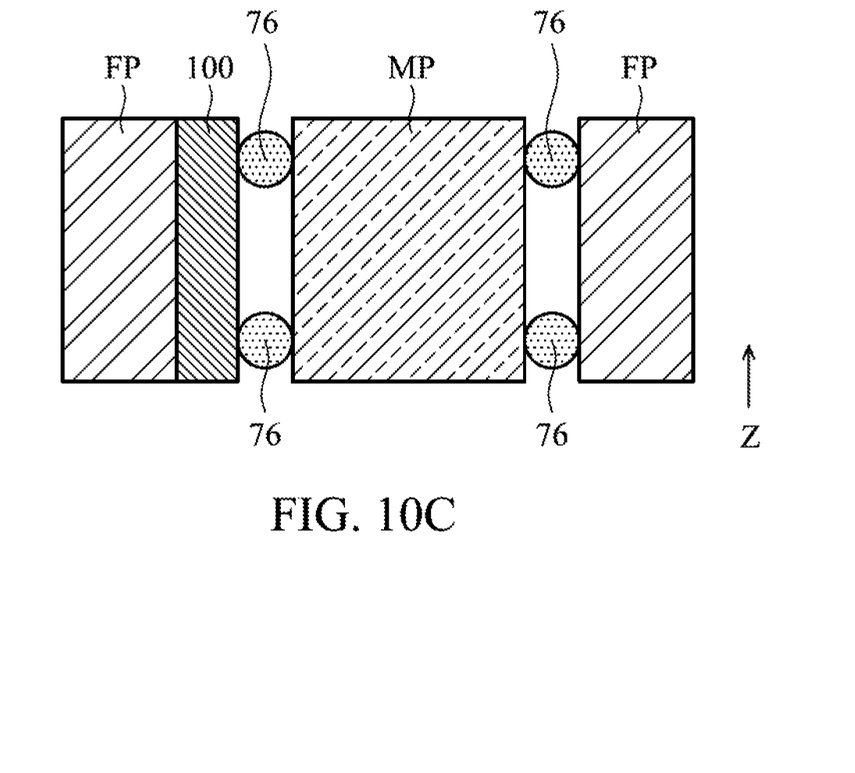

FIG. 10C is a schematic view illustrating relative positions between the base 20, the holder 30, the rolling elements 76 and the flexible plastic structure 100 after assembly in accordance with another embodiment of the present disclosure. The difference between this embodiment and the embodiment shown in FIG. 10B is that the flexible plastic structure 100 is only formed on the surface (the first surface) of one side of the base 20 (the first component) or the surface (the second surface) of one side of the holder 30 (the second component), and the flexible plastic structure 100 is not formed on the rest part of the base 20 and the holder 30. In this way, when the holder 30 moves, the tilt problem generated due to tolerance of size can also be improved.

Figure 10D:
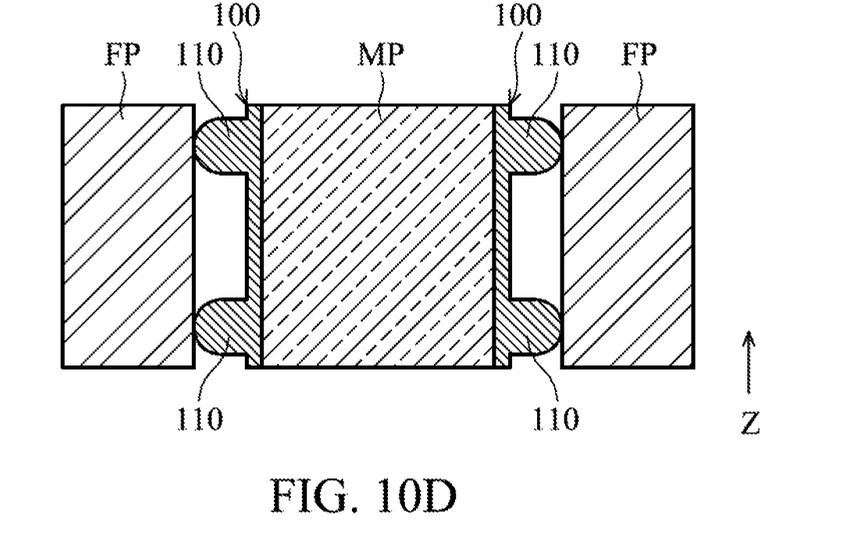
FIGS. 10D-10E are schematic views illustrating relative positions between the base, the holder and the flexible plastic structure after assembly in accordance with another embodiment of the present disclosure.

FIG. 10D is a schematic view illustrating relative positions between the base 20, the holder 30 and the flexible plastic structure 100 after assembly in accordance with another embodiment of the present disclosure. As shown in FIG. 10D, a flexible plastic structure 100 (such as Hytrel®8238 elastomer) with a special shape can be formed on a surface of the holder 30 (the second component) that is opposite to the base 20 (the first component). For example, at least one protruding portion 110 may be formed on the flexible plastic structure 100 to contact the base 20 (the first component). In this embodiment, the aforementioned rolling elements 76 are replaced by the protruding portions 110 such that the holder 30 (the second component) can be in contact with the base 20 (the first component) through the flexible protruding portions 110. Therefore, the holder 30 and the optical element may slide along the Z-axis direction (the direction of the optical axis O) relative to the base 20 through the protruding portions 110. Alternatively, the flexible plastic structure 100 with the special shape can be formed on a surface of the base 20 (the first component) that is opposite to the holder 30 (the second component such that the protruding portions 110 are in contact with the holder 30 (the second component), and thereby the holder 30 and the optical element may also slide along the Z-axis direction (the direction of the optical axis O) relative to the base 20 through the protruding portions 110.

Figure 10E:
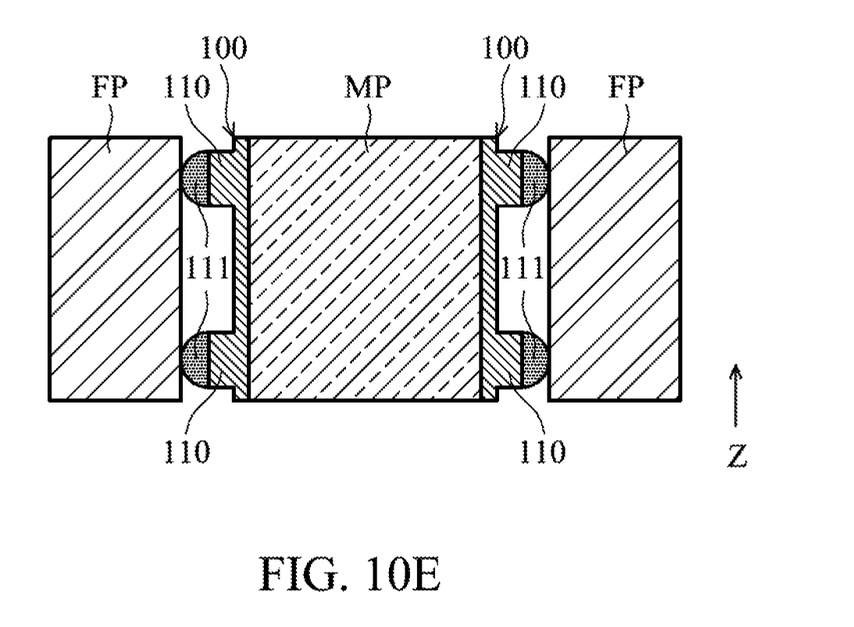

FIG. 10E is a schematic view illustrating relative positions between the base 20, the holder 30 and the flexible plastic structure 100 after assembly in accordance with another embodiment of the present disclosure. The difference between this embodiment and the embodiment shown in FIG. 10D is that contact blocks 111 are disposed outside the protruding portions 110 of the flexible plastic structure 100, and thereby the contact blocks 111 may be in contact with the base 20 (the first component), wherein the contact blocks 111 are formed using harder plastic materials than the flexible plastic structure 100. That is to say, the hardness of the plastic materials is greater than that of the flexible plastic structure 100 such that the contact blocks 111 become more durable and more stable. The friction force of the contact surface can be reduced by the contact between the contact blocks 111 with high hardness plastic materials and the base 20 (the first component), and the holder 30 can move more successfully.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure, as long as may perform substantially the same function in the aforementioned embodiments and obtain substantially the same result may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

Although the preferable embodiments of the present disclosure have been described above, however, these embodiments are not intended to limit the present disclosure. Those skilled in the art may make some changes and alterations without departing from the spirit and scope of the present disclosure. Therefore, the scope of the present disclosure may be defined referring to the appended claims. Furthermore, each of the appended claims constructs an individual embodiment, and the scope of the present disclosure also includes every combination of the appended claims and embodiments.

What is claimed is:

1. An optical element driving mechanism, comprising:
a first component having a first surface;
a second component disposed corresponding to the first component, wherein the first surface is facing the second component;
an optical element driving assembly configured to drive an optical element;
a flexible plastic structure formed on the first surface of the first component, wherein the hardness of the first component is greater than the hardness of the flexible plastic structure; and
a rolling element disposed between the first component and the second component.

2. An optical element driving mechanism, comprising:
a first component having a first surface;
a second component disposed corresponding to the first component, wherein the first surface is facing the second component, and the second component is movable relative to the first component;
an optical element driving assembly configured to drive an optical element; and
a flexible plastic structure formed on the first surface of the first component, wherein the hardness of the first component is greater than the hardness of the flexible plastic structure.

3. The optical element driving mechanism as claimed in claim 2, wherein the optical element driving mechanism further comprises a rolling element disposed between the first component and the second component.

4. An optical element driving mechanism, comprising:
a first component having a first surface;
a second component disposed corresponding to the first component, wherein the first surface is facing the second component, and the second component further comprises a second surface facing the first surface;
an optical element driving assembly configured to drive an optical element; and
a flexible plastic structure formed on the first surface of the first component and the second surface of the second component, wherein the hardness of the first component is greater than the hardness of the flexible plastic structure.

5. The optical element driving mechanism as claimed in claim 4, wherein the optical element driving mechanism further comprises a rolling element disposed between the first component and the second component.

6. The optical element driving mechanism as claimed in claim 1, wherein the flexible plastic structure has a protruding portion, and the protruding portion is in contact with the second component.

7. The optical element driving mechanism as claimed in claim 6, wherein the optical element driving mechanism further comprises a contact block formed on the protruding portion and in contact with the second component, and the hardness of the contact block is greater than the hardness of the flexible plastic structure.

8. An optical element driving mechanism, comprising:
a first component having a first surface and a protruding stopping portion;
a second component disposed corresponding to the first component, wherein the first surface is facing the second component;
an optical element driving assembly configured to drive an optical element; and
a flexible plastic structure formed on the first surface of the first component and the second component, wherein the hardness of the first component is greater than the hardness of the flexible plastic structure, and the flexible plastic structure contacts the stopping portion when the second component moves to a limit position relative to the first component.

9. The optical element driving mechanism as claimed in claim 1, wherein the optical element driving mechanism further comprises a housing connected to the first component, and the flexible plastic structure is formed between the housing and the first component.

10. The optical element driving mechanism as claimed in claim 9, wherein the housing and the first component are press-fitted.

11. The optical element driving mechanism as claimed in claim 1, wherein the flexible plastic structure is formed by double injection, insert molding, or chemical plating.

12. The optical element driving mechanism as claimed in claim 1, wherein the Share D Hardness of the flexible plastic structure is in a range of 32 degrees to 82 degrees.

13. The optical element driving mechanism as claimed in claim 1, wherein the flexible plastic structure is a thermoplastic polyester elastomer or a Hytrel®8238 elastomer.

14. An optical element driving mechanism, comprising:
a first component;
a second component disposed corresponding to the first component, wherein the second component is movable relative to the first component;
an optical element driving assembly configured to drive an optical element;
an elastic element connecting the first component with the second component; and
a flexible plastic structure formed on the elastic element, wherein the hardness of the first component is greater than the hardness of the flexible plastic structure, and the flexible plastic structure completely encompasses the elastic element.

15. The optical element driving mechanism as claimed in claim 14, wherein the elastic element further comprises a first section and a second section, and the flexible plastic structure connects the first section with the second section.

16. The optical element driving mechanism as claimed in claim 14, wherein the flexible plastic structure is formed by double injection, insert molding, or chemical plating.

17. The optical element driving mechanism as claimed in claim 14, wherein the Share D Hardness of the flexible plastic structure is in a range of 32 degrees to 82 degrees.

18. The optical element driving mechanism as claimed in claim 14, wherein the flexible plastic structure is a thermoplastic polyester elastomer or a Hytrel®8238 elastomer.

* * * * *